US012732841B2

(12) United States Patent
Caporal Del Barrio et al.

(10) Patent No.: US 12,732,841 B2
(45) Date of Patent: Sep. 8, 2026

(54) CONFIGURATION OF TRANSMISSION GAPS

(71) Applicant: Nokia Technologies Oy, Espoo (FI)

(72) Inventors: Samantha Caporal Del Barrio, Aalborg (DK); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 366 days.

(21) Appl. No.: 18/554,568

(22) PCT Filed: Mar. 24, 2022

(86) PCT No.: PCT/EP2022/057770

§ 371 (c)(1),
(2) Date: Oct. 9, 2023

(87) PCT Pub. No.: WO2022/218671

PCT Pub. Date: Oct. 20, 2022

(65) Prior Publication Data

US 2024/0381138 A1 Nov. 14, 2024

(30) Foreign Application Priority Data

Apr. 12, 2021 (FI) ..................................... 20215430

(51) Int. Cl.
*H04W 24/08* (2009.01)
*G01S 7/00* (2006.01)
(Continued)

(52) U.S. Cl.
CPC ............. *H04W 24/08* (2013.01); *G01S 7/006* (2013.01); *G01S 13/08* (2013.01); *H04W 52/146* (2013.01)

(58) Field of Classification Search
CPC ............... H04W 24/08; H04W 52/146; H04W 36/0088; H04W 52/367; G01S 7/006; G01S 13/08
See application file for complete search history.

(56) References Cited

U.S. PATENT DOCUMENTS

2018/0287651 A1 10/2018 Fernando et al.
2020/0411960 A1 12/2020 Ng et al.
(Continued)

FOREIGN PATENT DOCUMENTS

WO 2018/022182 A1 2/2018
WO 2018/132220 A2 7/2018
(Continued)

OTHER PUBLICATIONS

Office action received for corresponding European Patent Application No. 22718137.7, dated Nov. 6, 2024, 6 pages.
(Continued)

*Primary Examiner* — Yaotang Wang
(74) *Attorney, Agent, or Firm* — Lippes Mathias LLP

(57) ABSTRACT

There is provided an apparatus comprising at least one processor; and at least one memory including computer program code, the at least one memory and the computer program code configured to, with the at least one processor, cause the apparatus at least to perform: receiving, from a network node, a configuration of a transmission gap in at least one downlink slot; and performing radar measurements during the transmission gap.

10 Claims, 12 Drawing Sheets

(51) Int. Cl.
*G01S 13/08* (2006.01)
*H04W 52/14* (2009.01)

(56) References Cited

U.S. PATENT DOCUMENTS

2021/0055385 A1 2/2021 Rimini et al.
2021/0076349 A1 3/2021 Loffe et al.
2023/0100583 A1* 3/2023 Niu ....................... H04W 24/10
2023/0217322 A1* 7/2023 Peng ..................... H04W 36/14
370/331

FOREIGN PATENT DOCUMENTS

WO 2021/008710 A1 1/2021
WO 2021/028057 A1 2/2021

OTHER PUBLICATIONS

"3rd Generation Partnership Project; Technical Specification Group Radio Access Network; NR; Physical layer procedures for control (Release 16)", 3GPP TS 38.213, V16.4.0, Dec. 2020, pp. 1-181.
"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
"UL gaps for Tx power management", 3GPP TSG-RAN WG4 Meeting #98-e, R4-2100218, Agenda: 11.3.4.1, Apple, Jan. 25-Feb. 5, 2021, pp. 1-7.
"WF on FR2 enhancement part 3: UL gap", 3GPP TSG-RAN WG4#97-e Meeting, R4-2016919, Apple, Nov. 2-13, 2020, pp. 1-6.
Office action received for corresponding Finnish Patent Application No. 20215430, dated Sep. 27, 2021, 8 pages.
Office action received for corresponding Finnish Patent Application No. 20215430, dated Feb. 10, 2022, 7 pages.
International Search Report and Written Opinion received for corresponding Patent Cooperation Treaty Application No. PCT/EP2022/057770, dated Jul. 25, 2022, 12 pages.
"3rd Generation Partnership Project; Technical Specification Group Radio Access Network; NR; Physical layer procedures for data (Release 16)", 3GPP TS 38.214, V16.5.0, Mar. 2021, pp. 1-171.

* cited by examiner

Fig. 4

CONFIGURATION OF TRANSMISSION GAPS

RELATED APPLICATION

This application claims priority to PCT Patent Application No. PCT/EP2022/057770, filed Mar. 24, 2022, which claims priority to FI Patent Application, filed Apr. 12, 2021, which is incorporated herein by reference in its entirety.

FIELD

Various example embodiments relate to configuration of transmission gaps.

BACKGROUND

There are regulations for user equipments, such as mobile phones, regarding the field strength and power density of the transmitters of the user equipments. In some occasions, transmission power of the user equipments may need to be reduced. This might have a negative impact on the functionality of the user equipment.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus comprising at least one processor; and at least one memory including computer program code, the at least one memory and the computer program code configured to, with the at least one processor, cause the apparatus at least to perform: receiving, from a network node, a configuration of a transmission gap in at least one downlink slot; and performing radar measurements during the transmission gap.

According to a second aspect, there is provided an apparatus comprising at least one processor; and at least one memory including computer program code, the at least one memory and the computer program code configured to, with the at least one processor, cause the apparatus at least to perform: configuring a user equipment with a transmission gap in at least one downlink slot.

According to a third aspect, there is provided a method comprising: receiving, by a user equipment from a network node, a configuration of a transmission gap in at least one downlink slot; and performing radar measurements during the transmission gap.

According to an embodiment, the method comprises adjusting, based on the radar measurements, transmission power of one or more uplink transmissions following the at least one downlink slot.

According to an embodiment, the transmission gap is located in a beginning of the at least one downlink slot or in an end of the at least one downlink slot.

According to an embodiment, the transmission gap is configured in one orthogonal frequency division multiplexing, OFDM, symbol in the at least one downlink slot; or the transmission gap is configured in a plurality of OFDM symbols.

According to an embodiment, the method comprises calculating a running average of the radar measurements performed during the transmission gap configured in the plurality of OFDM symbols; and adjusting, based on the running average, transmission power of one or more uplink transmissions following the at least one downlink slot.

According to an embodiment, the configuration further comprises a configuration of a transmission gap in one or more uplink slots and/or special slots.

According to an embodiment, the configuration comprises a configuration of a plurality of transmission gaps each configured in separate downlink slots; and the method comprises: performing radar measurements during the plurality of transmission gaps; calculating a running average over the radar measurements performed during the plurality of transmission gaps; adjusting, based on the running average over the radar measurements, transmission power of one or more uplink transmissions following the downlink slots.

According to an embodiment, the method comprises: detecting an object in proximity of the apparatus based on the radar measurements; determining a distance between the apparatus and the object based on the radar measurements; adjusting transmission power of one or more uplink transmissions following the at least one downlink slot based on the determined distance.

According to a fourth aspect, there is provided a non-transitory computer readable medium comprising program instructions that, when executed by at least one processor, cause an apparatus to at least: receive, from a network node, a configuration of a transmission gap in at least one downlink slot; and perform radar measurements during the transmission gap.

According to various embodiments, the non-transitory computer readable medium comprising program instructions that, when executed by at least one processor, cause the apparatus to perform the method of any of the embodiments of the third aspect.

According to further aspect, there is provided a computer program configured to cause the method of the third aspect and any of the embodiment thereof to be performed.

According to a further aspect, there is provided an apparatus comprising at least one processor; and at least one memory including computer program code, the at least one memory and the computer program code configured to, with the at least one processor, cause the apparatus at least to perform: configuring a user equipment with a transmission gap in at least one downlink slot.

According to an embodiment, the transmission gap is configured in one orthogonal frequency division multiplexing, OFDM, symbol in the at least one downlink slot; or the transmission gap is configured in a plurality of OFDM symbols.

According to an embodiment, the at least one downlink slot comprises a single downlink slot in an uplink oriented frame further comprising a plurality of uplink slots; and a number of the OFDM symbols is two or more.

According to an embodiment, the at least one downlink slot comprises a single downlink slot in an uplink oriented frame further comprising a plurality of uplink slots; and the method comprise: configuring a transmission gap in one or more uplink slots and/or special slots.

According to an embodiment, the configuration is performed via downlink control information, radio resource control, and/or medium access control configuration.

According to an embodiment, the transmission gap is frequency multiplexed with transmission and/or reception.

According to a further aspect, there is provided a non-transitory computer readable medium comprising program instructions that, when executed by at least one processor, cause an apparatus to at least: configure a user equipment with a transmission gap in at least one downlink slot.

According to a further aspect, there is provided a computer program configured to cause an apparatus to configure a user equipment with a transmission gap in at least one downlink slot.

BRIEF DESCRIPTION OF THE DRAWINGS

FIG. 4 shows, by way of example, a flowchart of a method;

DETAILED DESCRIPTION

Figure 1:
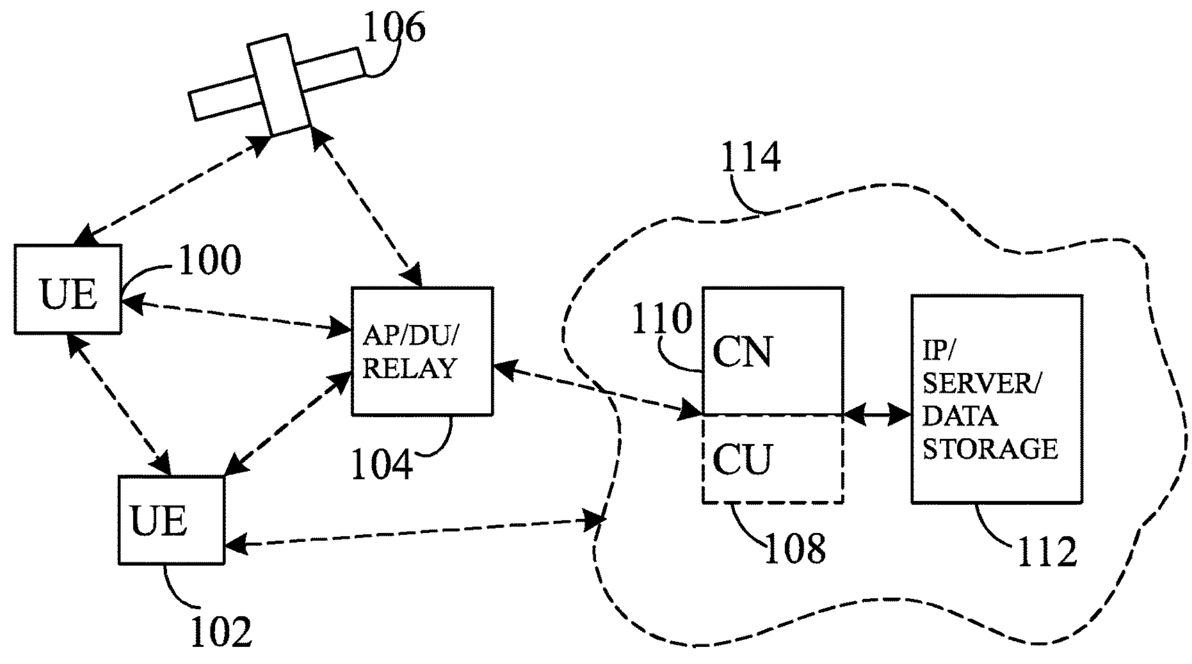
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link.

It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite 106 in the constellation may cover several satellite-enabled network entities that create on-ground cells. The on-ground cells may be created through an on-ground relay node 104 or by a gNB located on-ground or in a satellite.

Maximum Permissible Exposure (MPE) is the regulation on power density for the mmWave regime. For example, the Federal Communication Commission (FCC) and the International Commission on Non-Ionizing Radiation Protection (ICNIRP) have set the threshold for MPE at 10 W/m2 (1 mW/cm$^2$), for the general public, between 6 GHz and 100 GHz (FCC) or between 10 GHz and 100 GHz (ICNIRP). The energy absorbed by the human body increases as a function of the distance to the UE. Therefore, to comply with the MPE limit, the UE might have to reduce its output power if the user gets in close vicinity of the antenna. As some 5G NR bands operate at very high frequencies (FR2 and above), they require high gain antennas to maintain a good signal. However, high gain antennas direct a lot of energy that might come towards the user, and might exceed the set MPE threshold(s). Significantly reducing the output power may lead to losing the connection to the base station, e.g. gNB. In other words, a Radio Link Failure (RLF) may occur due to significant reduction of the output power of the UE. An example of significant reduction is at least 20 dB for power class 3 (PC3) UEs.

Let us consider maximum allowed effective isotropic radiated power (EIRP) (power amplifier (PA) power+array gain) as a function of distance separating a radiating antenna of the UE and the user. As the distance increases, the maximum allowed EIRP increases. For example, for a PC3 UE operating with EIRP 28 dBm (e.g. 1×4 array with 5 dB implementation loss), the UE needs to reduce its maximum output power by 18 dB from 7 cm onwards to comply with MPE. A larger array will require the UE to reduce its power at even larger distances. The maximum allowed EIRP drops to only 10 dBm at 2 mm on a 100% UL duty cycle. The UL is critically affected by MPE and even the lowest duty cycle of 15% only accounts for 8 dB of the back-off power.

Proximity sensors, e.g. infrared sensors, of the UE may be applied for proximity sensing. A trigger distance may be pre-defined such that as soon as a user is detected at trigger distance, based on proximity sensing, a maximum power reduction (MPR) or back-off is applied. This might work in FR1, where the trigger distance may be defined as below 1 cm, and the required MPR is small. However, in FR2, the trigger distance may be e.g. 10 cm or more and the back-off value, depending on the array design of the UE, may be e.g. 20 dB. When the user's location or distance from the UE can be defined more accurately, it is possible to define the power management MPR (P-MPR) dynamically. More power may be radiated by the UE, when the user's location can be accurately defined, and is e.g. within the trigger distance but the user is not touching the array. For example, in the example above, a dynamic power back-off would limit P-MPR to 3 dB when the user is detected at 6 cm, instead of 18 dB without accurate distance detection.

Such dynamic power back-off operation may be enabled by accurate proximity sensing, e.g. by re-using the FR2 array as a radar. Thus, there is no need for extra proximity sensors on the UE, which would require space and increase costs. Radar is based on a delay measurement. Distance between a detected object, e.g. a user, and the UE may be determined or measured along a line of sight. The radio waves of the radar propagate with a known velocity, speed of light. A time it takes by the radio waves to travel from the radar to the target and back may be measured by the UE. With this information (speed and time), the distance between the object and the radar may be calculated.

In wireless cellular systems one aim is to provide seamless mobility for users, which enables the users with their UEs, e.g. mobile devices such as smart phones, to move seamlessly within coverage area of a network. Mobility may be achieved through handover mechanism, in which the UE changes the cell.

Before the handover, the UE may measure signal quality of a target cell and report it to the network. The network may decide based on the measurement report whether to allow the UE to handover to the target cell or not. The UE may perform the required measurements during a measurement gap, which is a gap during which no transmission and/or reception occurs.

During these measurement gaps, an antenna array, e.g. FR2 array, of the UE may be used as a radar for accurate proximity sensing. When the distance between a blockage, e.g. a user, and the UE is determined accurately, the UE is able to optimize transmission (Tx) power under MPE events by avoiding unnecessary Tx power reduction, i.e. unnecessary P-MPR.

Figure 2:
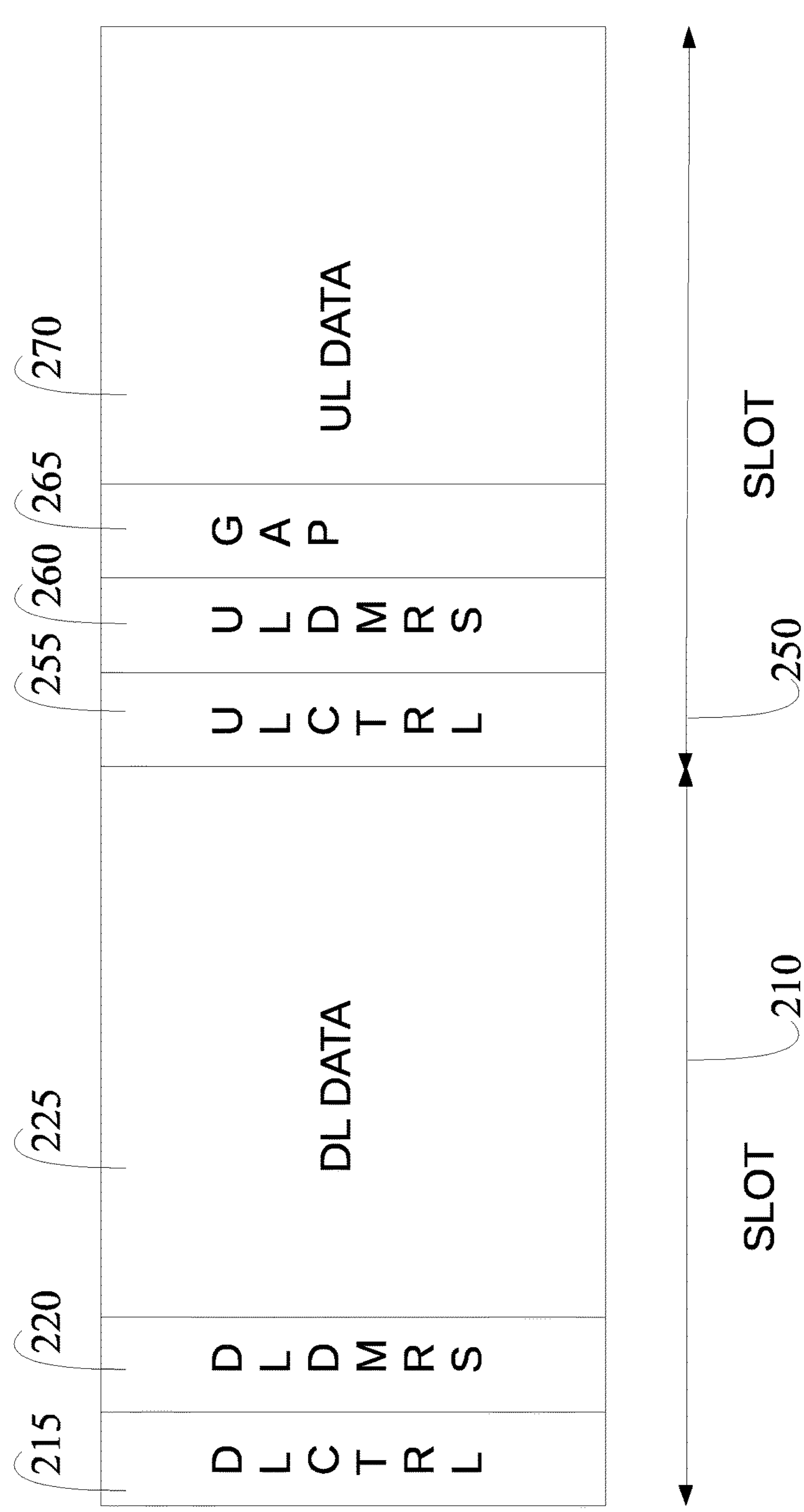
FIG. 2 shows, by way of example, a frame structure.

FIG. 2 shows, by way of example, a frame structure comprising a downlink slot 210 and an uplink slot 250. The DL slot 210 comprises a DL control (CTRL) signal 215, DL demodulation reference signal (DMRS) 220, and the DL data 225. The UL slot 250 comprises an UL CTRL signal 255, UL DMRS 260, and the UL data 270. In addition, an uplink gap 265 is placed in an uplink slot 250. For example, a gap of two symbols may be configured in the UL slot(s).

The UL gaps are UE specific or cell specific. A range of 0.25%-5% UL gap overhead may be considered for evaluation purposes, where the UL gap overhead is defined as the duration of UL gap over its periodicity. For example, for FR2 in numerology 3, the subcarrier spacing (SCS) is 120 kHz, and a subframe contains 8 slots in 1 ms. Therefore, the UL gap periodicity of 0.25% corresponds to 1 slot every 400 slots, which means 1 slot every 50 ms. Similarly, the UL gap periodicity of 5% corresponds to 1 slot every 20 slots, which means 1 slot per 2.5 ms. Thus, penalty caused by the gaps configured in UL slots may be large on UL transmissions, since the gaps consume resources. For purposes of MPE, the UE maximum EIRP may be averaged over several seconds. The UE may need to perform a large amount of proximity sensing measurements during the gaps until a blockage or target, e.g. a user, is detected. During the proximity sensing, the UE may need to operate under the assumption that some object may block the transmission, hence operating under very conservative assumptions. For example, the UE may operate with low transmit power which has a negative impact on the transmission.

Figure 3:
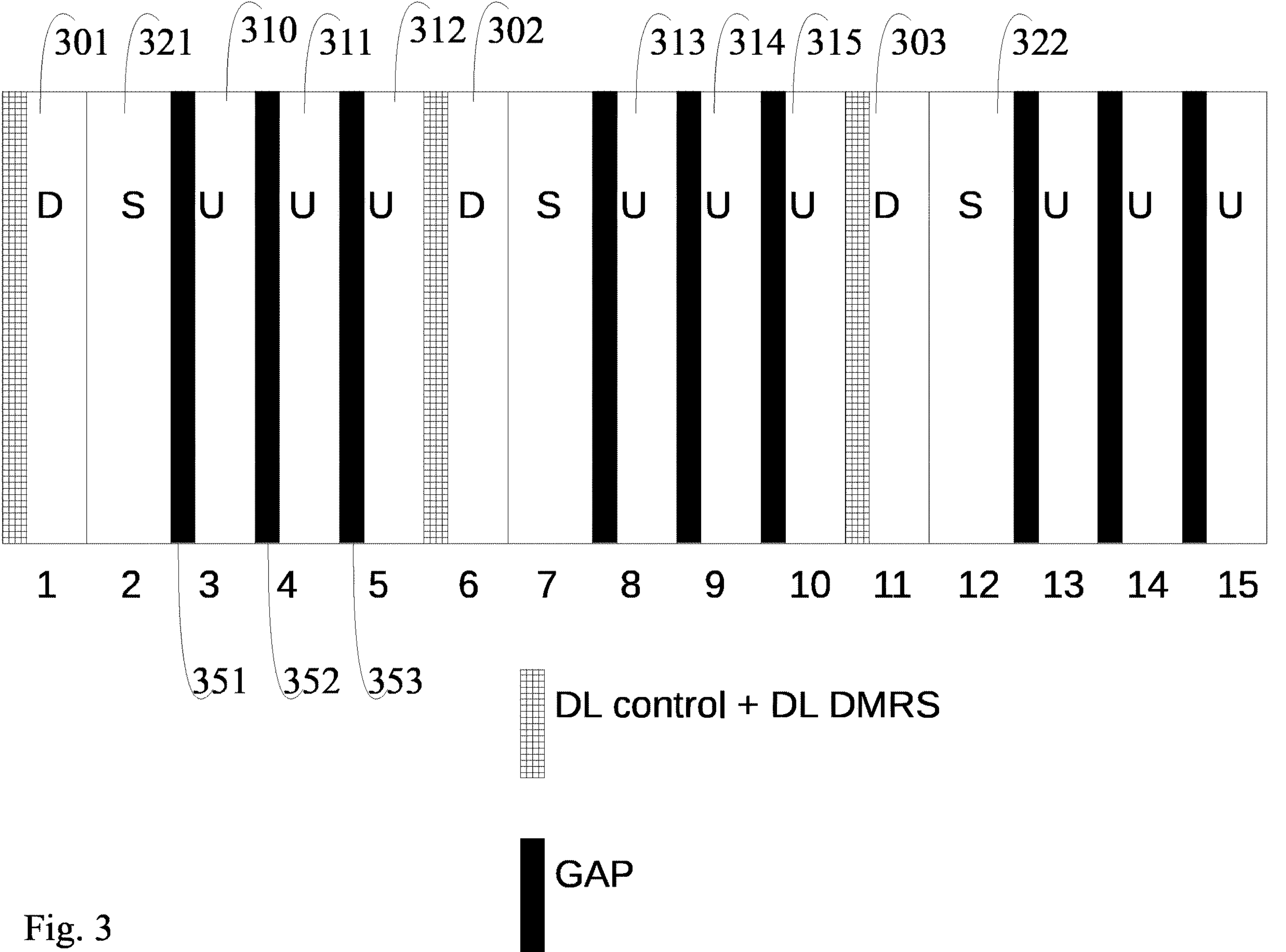
FIG. 3 shows, by way of example, an uplink oriented slots configuration.

FIG. 3 shows, by way of example, an uplink oriented slots configuration, wherein a frame structure comprises less DL slots (D) 301, 302, 303 than UL slots (U) 310, 311, 312. The frame structure may comprise special slots (S) 321, 322 as well. Each UL slot is configured with an UL gap 351, 352, 353. The UE performs proximity sensing measurements, e.g. radar measurements, in slots 3, 4 and 5. In slots 8, 9, and 10, the correct power back-off is utilized based on the previous measurements. However, further gaps may need to be configured as the radar/detection process is an ongoing event looking for potential blockers. For example, if the UE rotates in the DL slot 6 and/or in special (S) slot 7, the blockage detected by the measurements performed in slots 3, 4, 5 is lost.

Herein is provided configuration of transmission gaps in downlink slots. For example, the transmission gap, or a downlink (DL) gap, may be configured as blanked orthogonal frequency division multiplexing (OFDM) symbols located in DL slot(s). During the transmission gaps, the UE is allowed to perform radar measurements. Based on the radar measurements, the UE may determine the distance to a possibly detected user, and adjust transmission power accordingly. A possible need for power adjustments may be checked from a table or a curve, which has been created based on local legislation, for example. The UE may decrease the transmission power if user is detected in proximity of the UE, and increase the transmission power if user is not detected in proximity of the UE.

Figure 4:
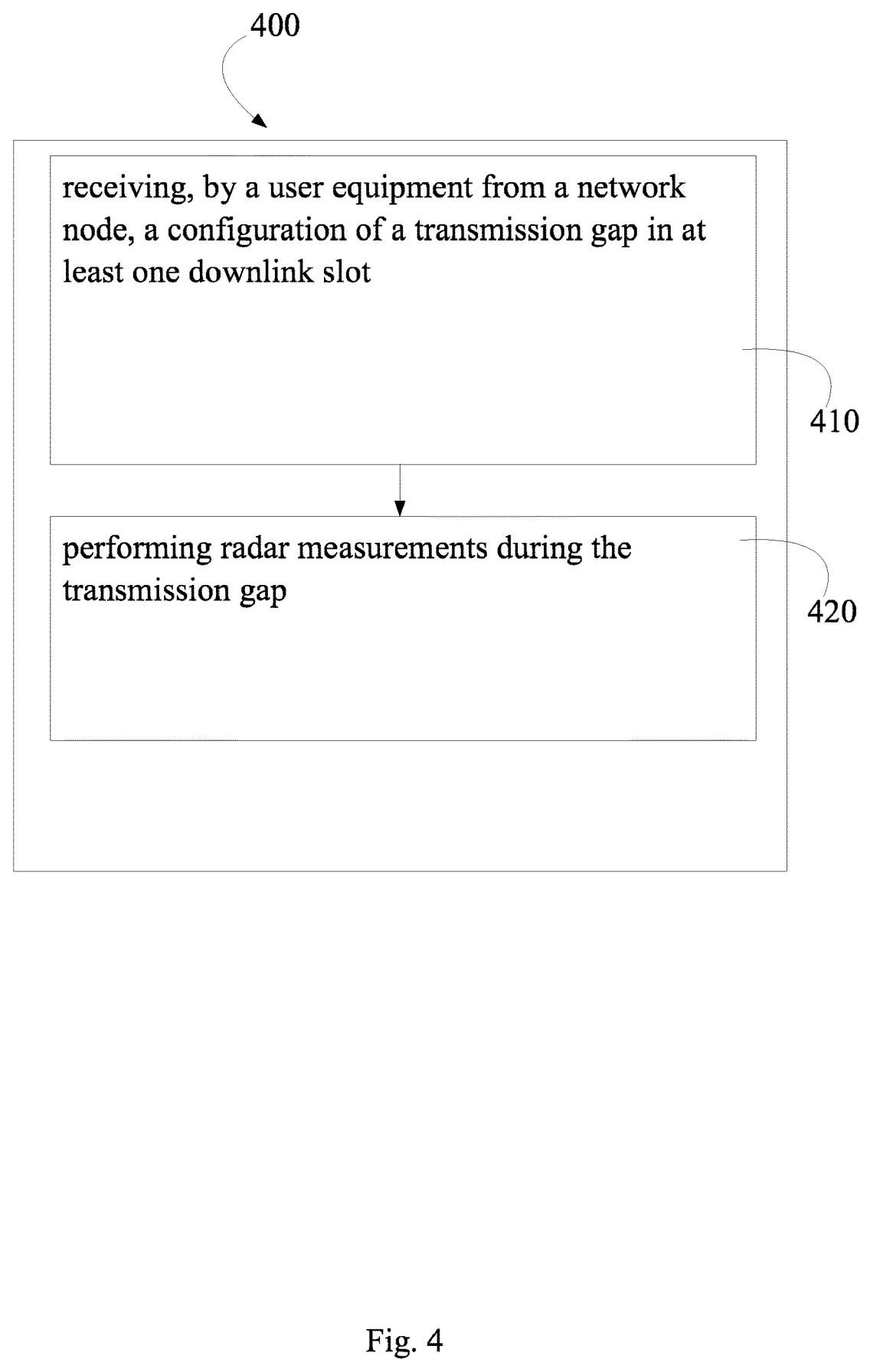

FIG. 4 shows, by way of example, a flowchart of a method 400. The method 400 may be performed by a user equipment, e.g. the UE 100 of FIG. 1, or in a control device configured to control the functioning thereof, when installed therein. The method 400 comprises receiving 410, by a user equipment from a network node, a configuration of a transmission gap in at least one downlink slot. The method 400 comprises performing 420 radar measurements during the transmission gap.

Figure 5:
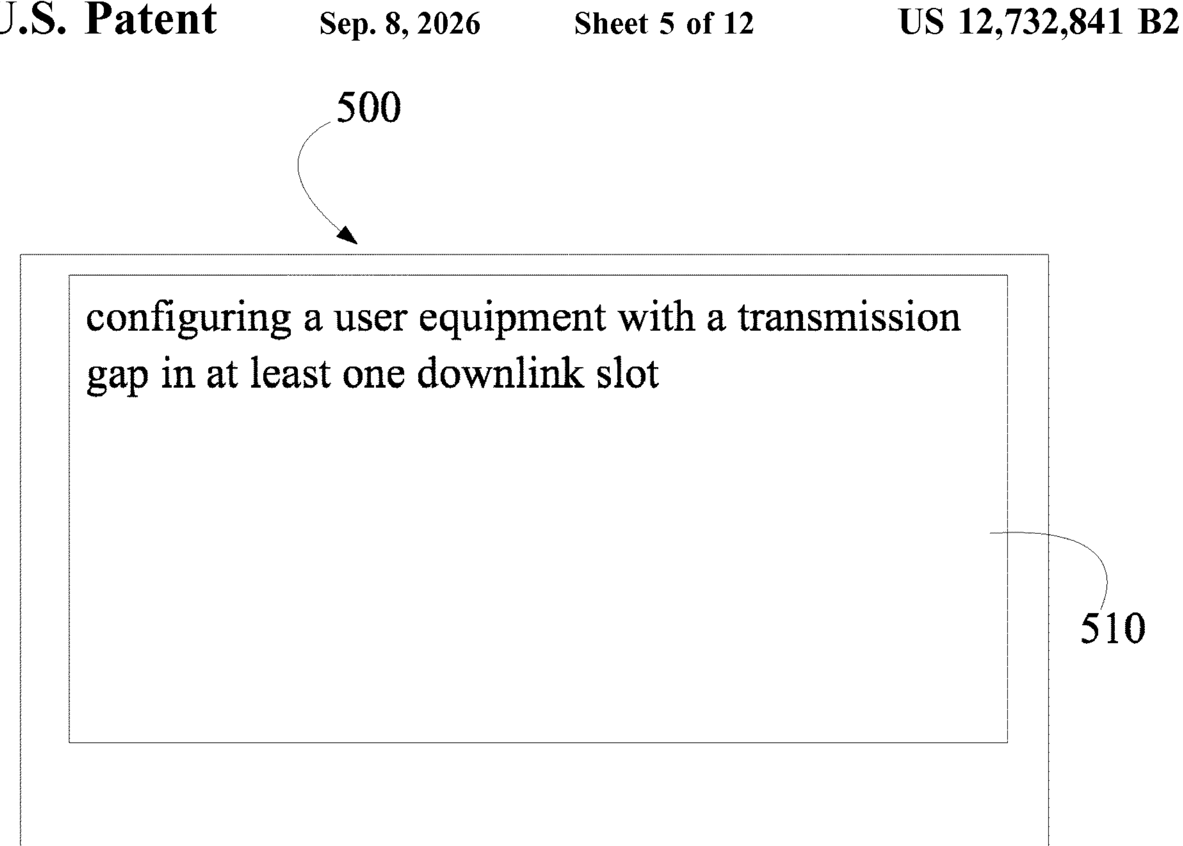
FIG. 5 shows, by way of example, a flowchart of a method.

FIG. 5 shows, by way of example, a flowchart of a method 500. The method 500 may be performed by a network node, e.g. the network node 104 of FIG. 1, such as a gNB, or in a control device configured to control the functioning thereof, when installed therein. The method 500 comprises configuring 510 a user equipment with a transmission gap in at least one downlink slot.

The method(s) as disclosed herein enable(s) saving of uplink resources, since uplink slots are not wasted for blockage detection purposes. The latency of the downlink gap is better compared to uplink gap. The method(s) as disclosed herein enable(s) uplink transmission with optimum power level, without unnecessary power reductions. The method(s) as disclosed herein enable(s) enhancing UE UL throughput and cell UL throughput by enabling UEs to increase Tx power when no user is detected based on the radar measurements.

In at least some embodiments, there is no transmission or reception during the gap, e.g. towards/from a network node and/or other UEs. In at least some embodiments, transmission and/or reception may occur during the gap. For example, the gap may be frequency multiplexed with DL or UL transmission dedicated to the UE. For example, radar may use frequencies in unlicensed spectrum, and frequencies beyond 52.6 GHz may offer the bandwidth for other transmission/reception.

Figure 6A:
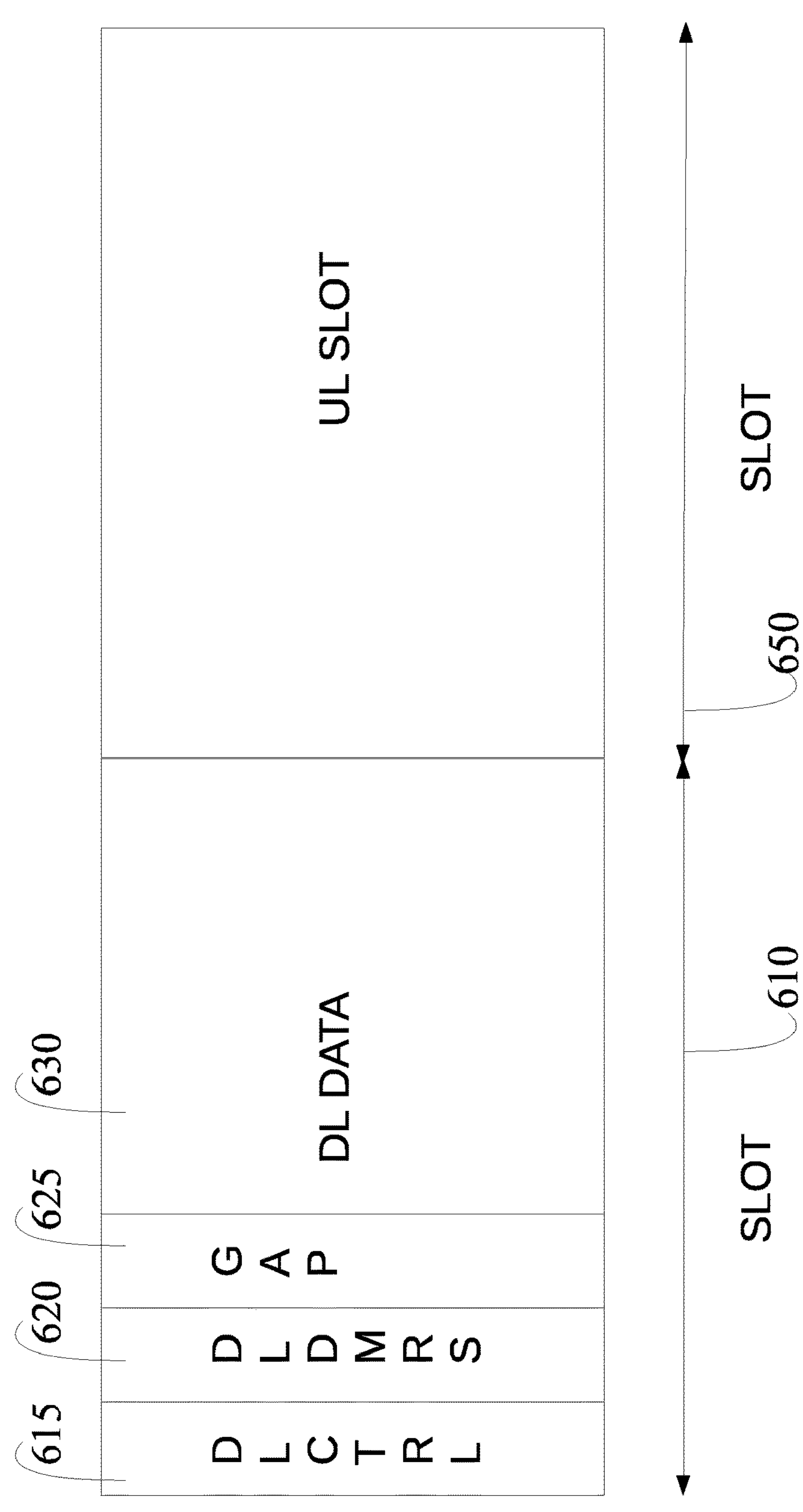
FIG. 6*a* shows, by way of example, a frame structure.

FIG. 6*a* shows, by way of example, a frame structure comprising a downlink slot 610 and an uplink slot 650. The DL slot 610 comprises a DL control (CTRL) signal 615, DL demodulation reference signal (DMRS) 620, and the DL data 630. In addition, a transmission gap 625 is configured or located in the beginning of the downlink slot 610. The transmission gap, or a DL gap, is configured as blanked OFDM symbols located in the beginning of the DL slot. For example, the gap may cover 1, 2, or 3 symbols. In the example of FIG. 6*a*, a small gap of two full OFDM symbols are blanked from the beginning of the DL transmission. The resulting transmission gap 625 allows the UE to perform radar measurements before the UL slot 650. Thus, UL slots are not wasted for blockage detection purposes. Configuration of the transmission gaps, or DL gaps, may be performed dynamically by a downlink control information (DCI), semi-statically via radio resource control (RRC) configuration or by medium access control (MAC) control element (CE) configuration.

Figure 6B:
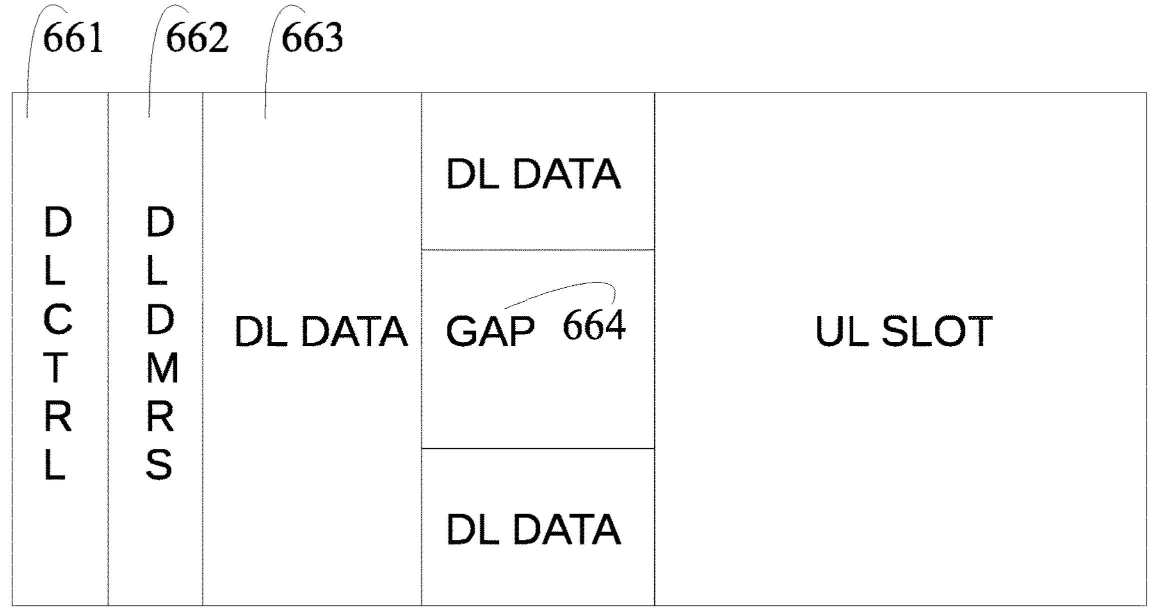
FIG. 6*b* shows, by way of example, a frame structure.
Figure 6B:

FIG. 6*b* shows, by way of example, a frame structure comprising a downlink slot 660 and an uplink slot 665. The DL slot 660 comprises a DL CTRL signal 661, DMRS 662, and the DL data 663. A transmission gap 664 is frequency multiplexed with DL transmission dedicated to a UE.

Figure 6C:
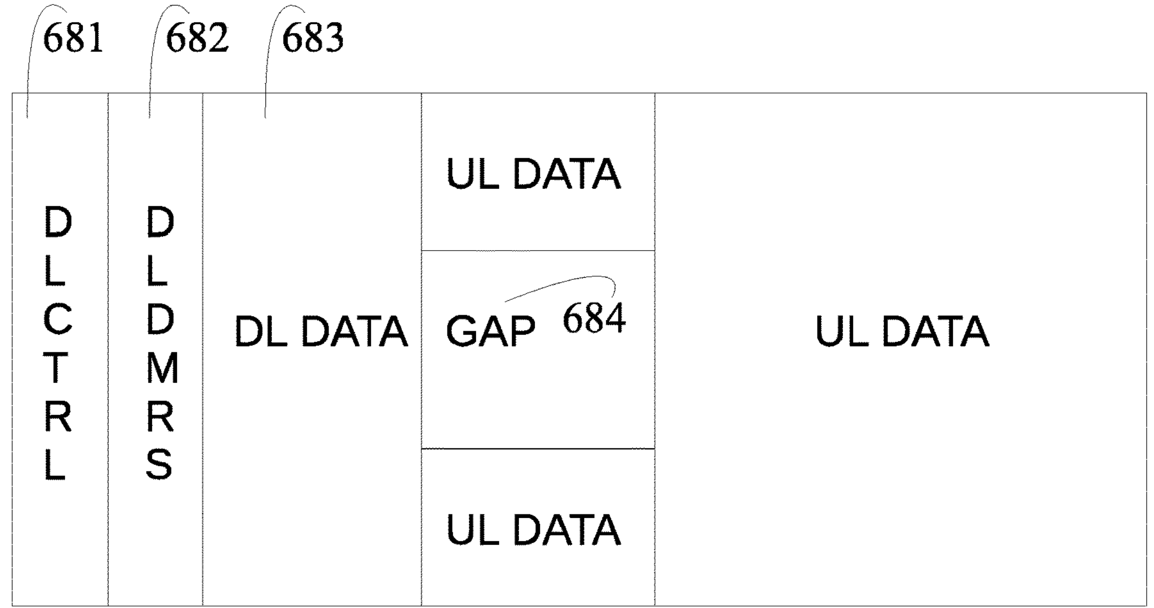
FIG. 6*c* shows, by way of example, a frame structure.
Figure 6C:

FIG. 6*c* shows, by way of example, a frame structure comprising a downlink slot 680 and an uplink slot 690. The DL slot 680 comprises a DL CTRL signal 681, DMRS 682, and the DL data 683. A transmission gap 684 is frequency multiplexed with UL transmission dedicated to a UE. In the example of FIG. 6*c*, the transmission gap is configured in an UL slot.

Figure 7:
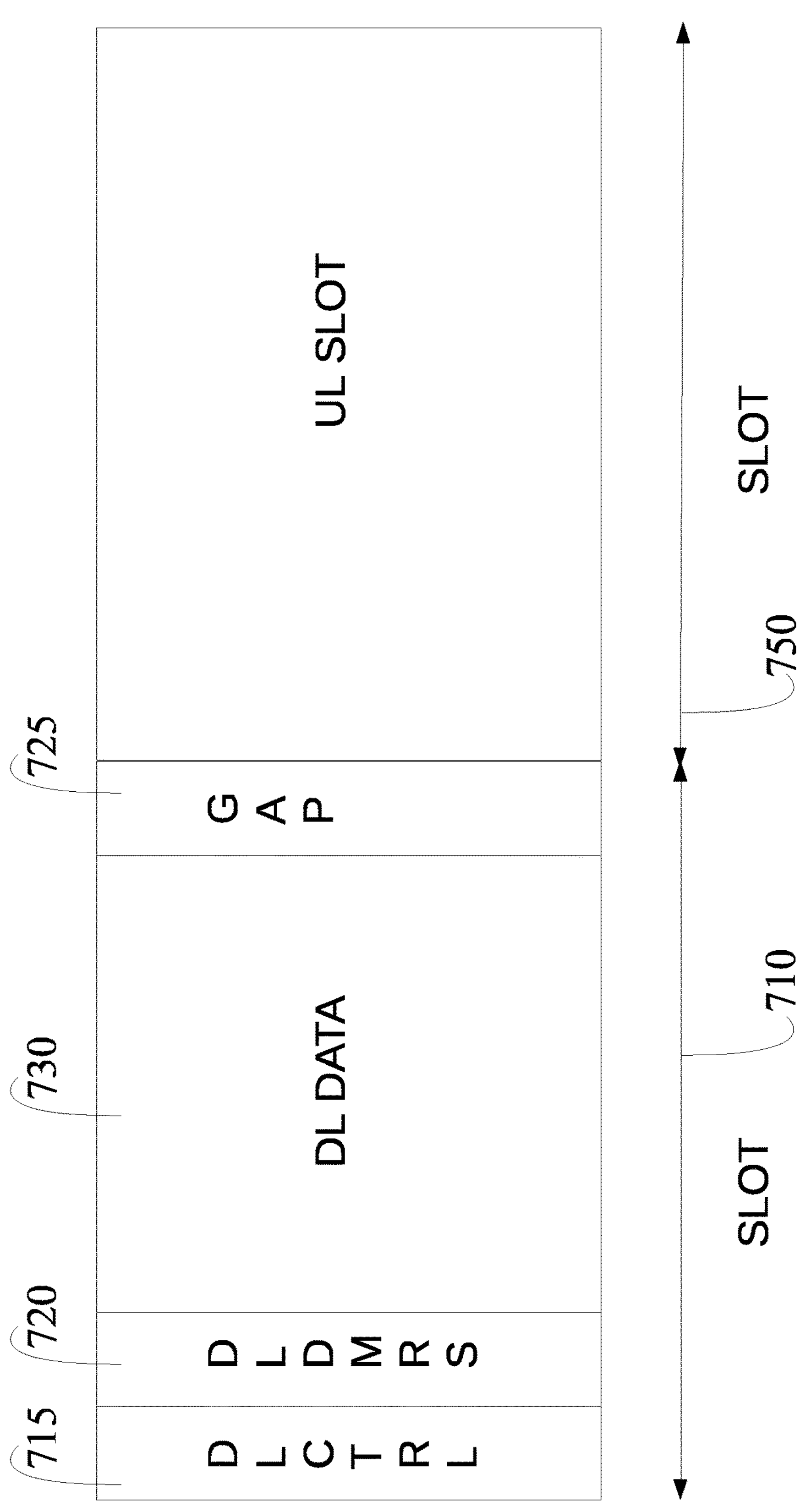
FIG. 7 shows, by way of example, a frame structure.

FIG. 7 shows, by way of example, a frame structure comprising a downlink slot 710 and an uplink slot 750. The DL slot 710 comprises a DL control (CTRL) signal 715, DL demodulation reference signal (DMRS) 720, and the DL data 730. In addition, a transmission gap 725 is configured or located in the end of the downlink slot 710. The transmission gap, or a DL gap, is configured as blanked OFDM symbols located in the end of the DL slot. For example, two full OFDM symbols are blanked from the end of the DL slot. Since the DL gap 725 is right before the UL slot 750, the UE is allowed to perform fresh measurements with respect to the upcoming UL transmission. Configuration of the transmission gaps, or DL gaps, may be performed dynamically by a downlink control information (DCI), semi-statically via radio resource control (RRC) configuration, or by MAC CE configuration.

Figure 8:
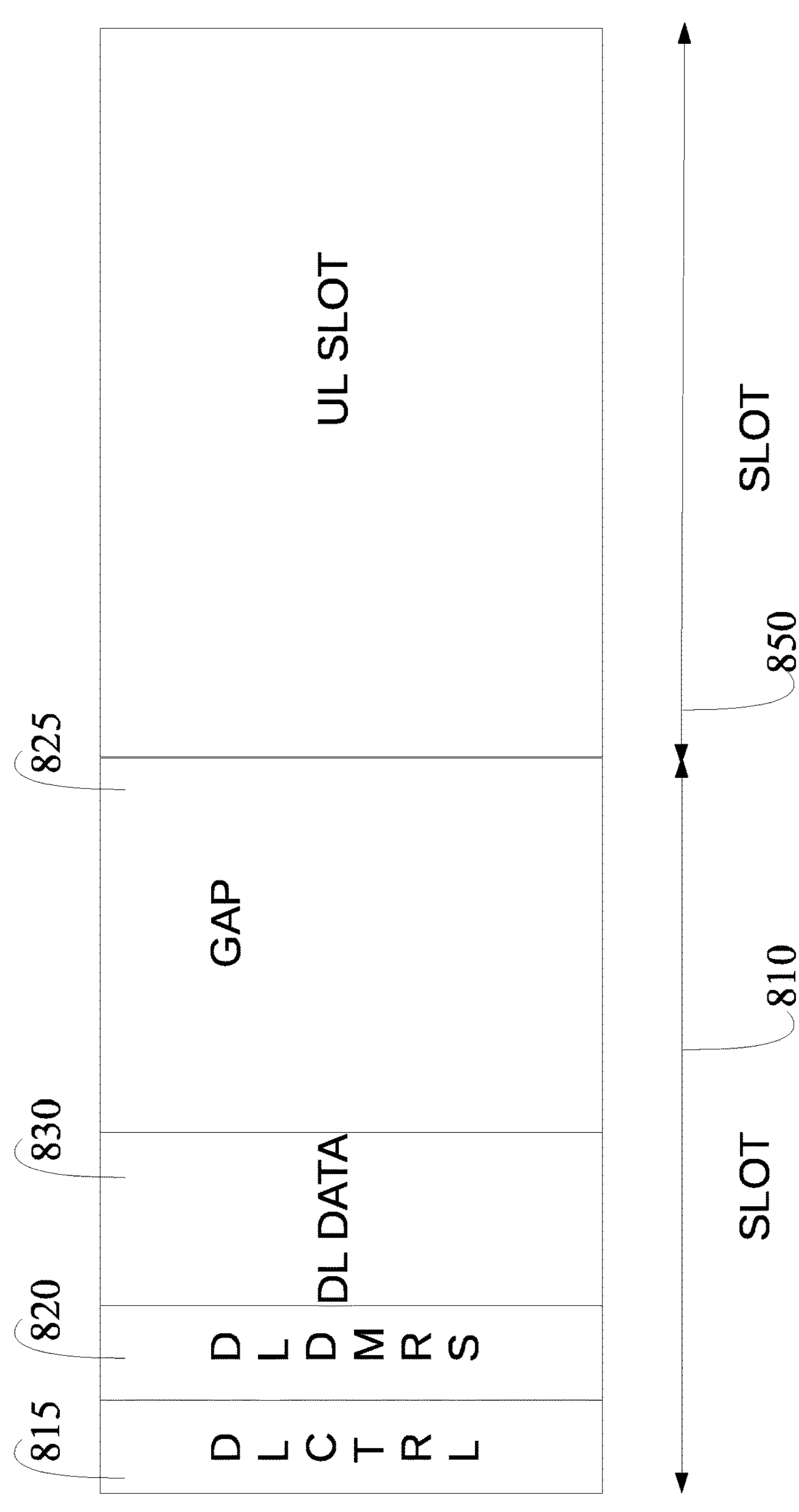
FIG. 8 shows, by way of example, a frame structure.

FIG. 8 shows, by way of example, a frame structure comprising a downlink slot 810 and an uplink slot 850. The DL slot 810 comprises a DL control (CTRL) signal 815, DL demodulation reference signal (DMRS) 820, and the DL data 830. In addition, a large or wide transmission gap 825 is configured or located in the end of the downlink slot 810. Alternatively, the gap 825 may be configured or located in the beginning of the DL slot 810. For example, the gap may cover 5, 6, 7, 8, or 9 symbols. In the example of FIG. 8, eight full OFDM symbols are blanked from the end of the DL slot. Such a large gap may be beneficial in uplink oriented frame configuration comprising a single DL slot or very few DL slots. The UE may use all the symbols to repeat MPE detection with averaging, and directly update the transmission power at the next UL slot. This way, the impact on UL transmission may be minimized. In case of a small number of symbols, e.g. 2 symbols, per DL slots, multiple slots may be needed for averaging. Configuration of the transmission gaps, or DL gaps, may be performed dynamically by a downlink control information (DCI), semi-statically via radio resource control (RRC) configuration or by MAC CE configuration.

Regarding a number of symbols in the gap, the number may be 1 or more. For example, a gap with more than one symbol, i.e. two or more, may be considered as a large gap. The gap may even be a full slot. As another example, if the gap covers more symbols than the data, the gap may be considered as a large gap, and if the gap covers less symbols than the data, the gap may be considered as a small gap. A gap may have a frequency selective component in the UE allocation. A full duplex UE may receive assigned DL data and also perform UL radar functionality in the provided GAP.

According to an embodiment, a large or long transmission gap (e.g. 8 symbols) may be used for initial MPE detection, and a small or short transmission gap (e.g. 2 symbols) may be used for calculation of a running average over multiple slots.

Figure 9:
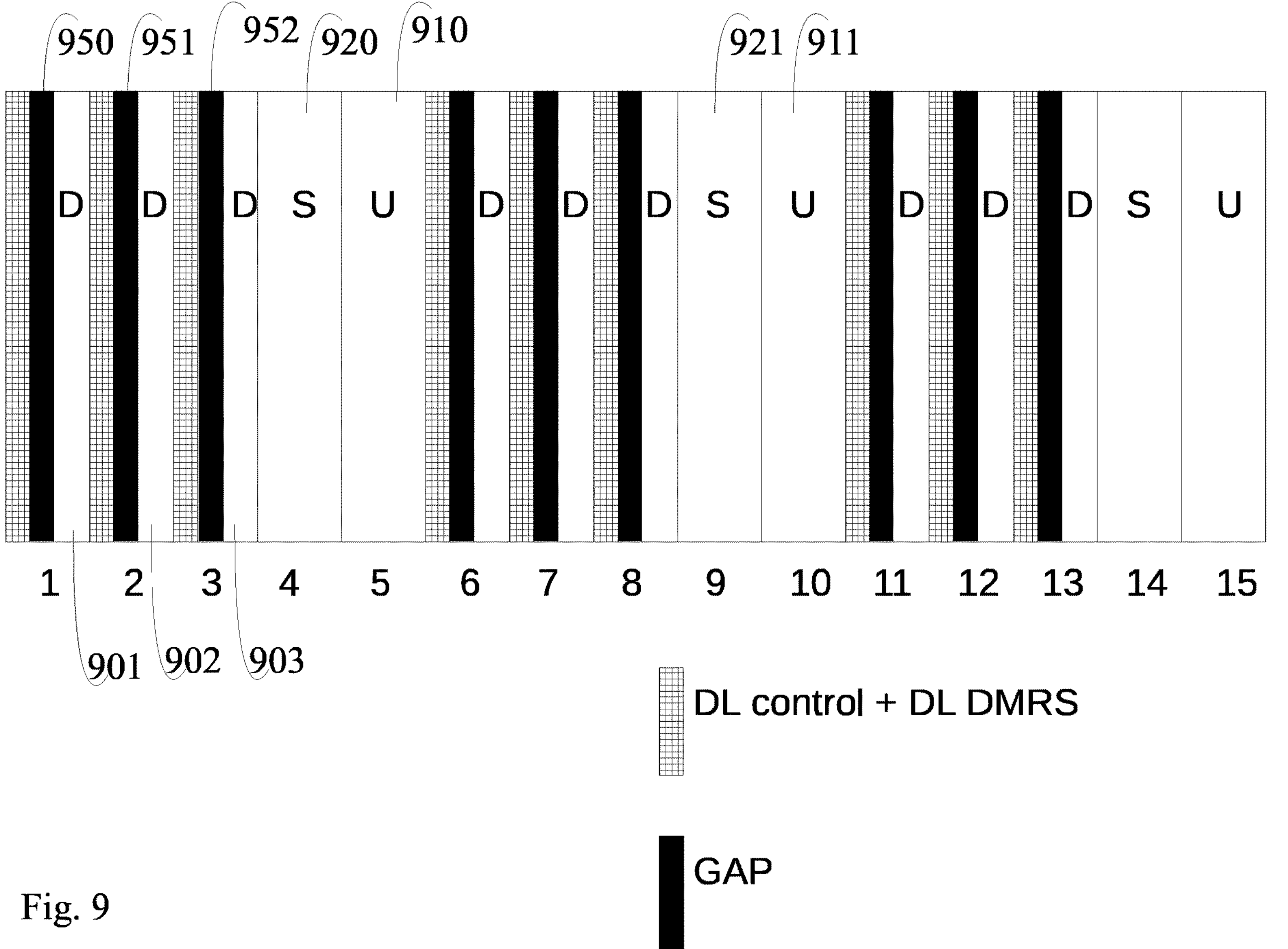
FIG. 9 shows, by way of example, a downlink oriented slots configuration.

FIG. 9 shows, by way of example, a downlink oriented slots configuration, wherein a frame structure comprises less UL slots (U) 910, 911 than DL slots (D) 901, 902, 903. The frame structure may comprise special slots (S) 920, 921 as well. Transmission gaps 950, 951, 952 are configured in DL slots 901, 902, 903, e.g. in each DL slots. Transmission gaps may be configured in the beginning or in the end of the DL slot. If a blockage has been detected based on radar measurements performed by the UE during the transmission gaps in the DL slots, decisions based on the detected blockages may be used for UL slots configured after the DL slots. For example, the measurements performed in slots 1, 2 and 3 may be used for setting the correct MPE P-MPR level to be used for slots 4 and 5. As another example, the measurements performed in slots 6, 7 and 8 may be used for setting the correct MPE P-MPR level to be used for slots 9 and 10. As a further example, the measurements performed in slots 11, 12 and 13 may be used for setting the correct MPE P-MPR level to be used for slots 14 and 15. Alternatively, measurements may be averaged over longer slots, e.g. over slots 1, 2, 3, 6, 7 and 8, and the resulting average may be used for adjusting transmission power in slots 9 and 10.

Figure 10:
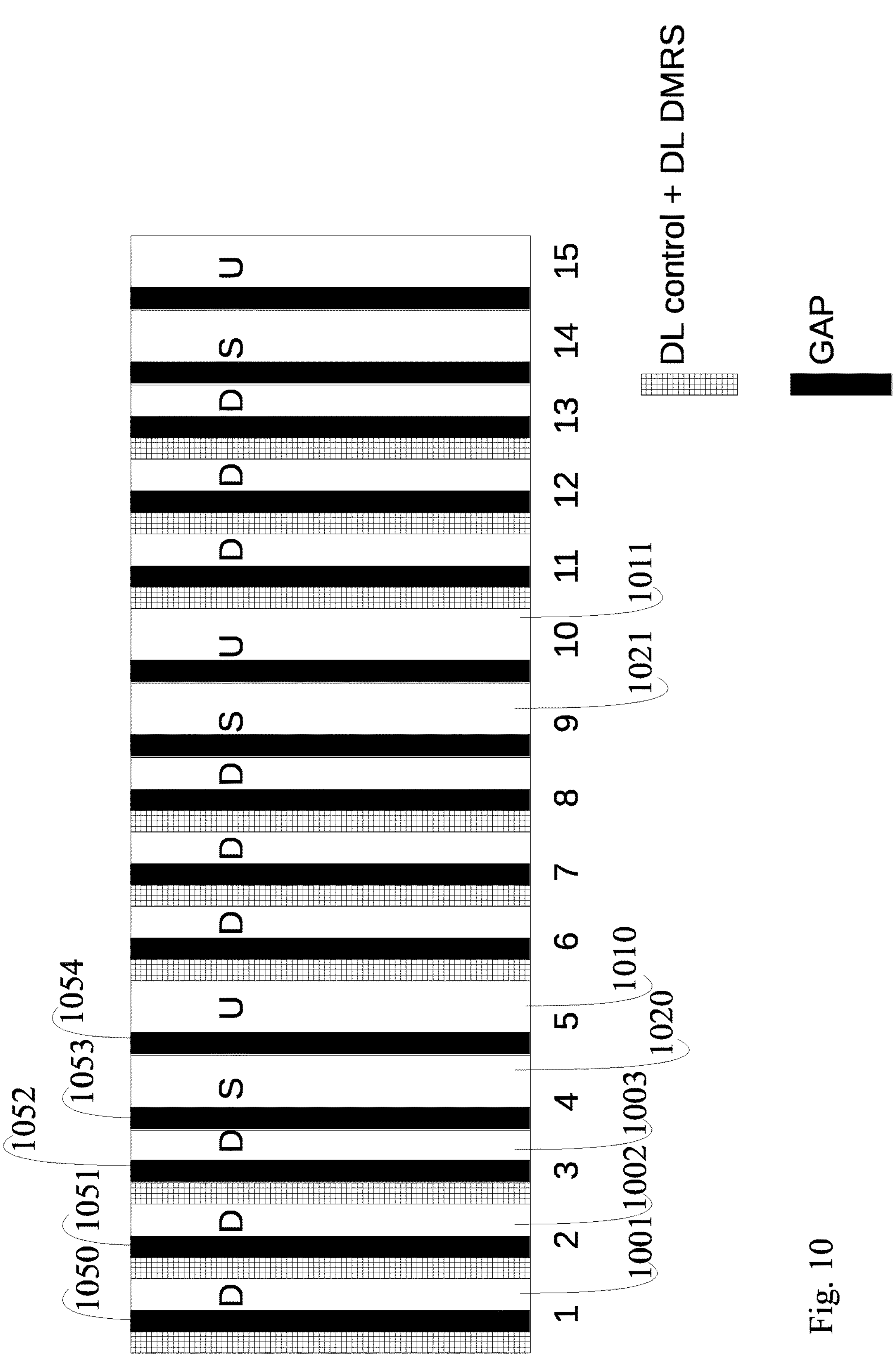
FIG. 10 shows, by way of example, a downlink oriented slots configuration.

FIG. 10 shows, by way of example, a downlink oriented slots configuration, wherein a frame structure comprises less UL slots (U) 1010, 1011 than DL slots (D) 1001, 1002, 1003. The frame structure may comprise special slots (S) 1020, 1021 as well. Transmission gaps may be configured across different types of slots. For example, transmission gaps may be configured in DL slots and in UL slots. In the example of FIG. 10, transmission gaps 1050, 1051, 1052, 1053, 1054 are configured in all slots, that is, in DL, S and UL. Configuring transmission gaps in all slots may enable the fastest and most accurate MPE detection in terms of UE beam granularity for UEs with multiple arrays and a high number of beam configurations per array. However, configuring transmission gaps in all slots is a trade-off between accuracy and resource consumption.

In a time division duplex (TDD) frame configuration, the transmission gaps may be flexibly configured with respect to the DL/UL slot ratio. For example, in a DL oriented frame, the transmission gaps may be configured in the DL slots. For example, gaps of a small number of symbols, e.g. 2 symbols, may be configured in the beginning or in the end of the DL slot. For close detection, for example, the gap may cover one symbol.

As another example, in an UL oriented frame, e.g. with a single DL slot and multiple UL slots, the transmission gaps may be configured in several OFDM symbols part of the DL slot. For example, a large transmission gap, e.g. of 8 symbols, may be configured in the end or in the beginning of the DL slot. Alternatively, the transmission gaps may be configured in both the DL and the UL slots, or in DL, UL and special (S) slots.

The DL and UL transmissions may happen with different spatial filters (beams) from UE perspective. Furthermore, these can be received/transmitted from different UE antenna arrays/patches/panels. A gap in the DL transmission would allow the UE antenna array/patch to perform measurements needed for UL transmission. If different spatial filters are used, some switching time may be needed to change the panel, for example. UE implementations might keep active the panels which are supposed to be part of the measurement process so that the switching time is minimized or it is even zero, for example 2 ns for the switch operation between two active beams/panels.

Figure 11:
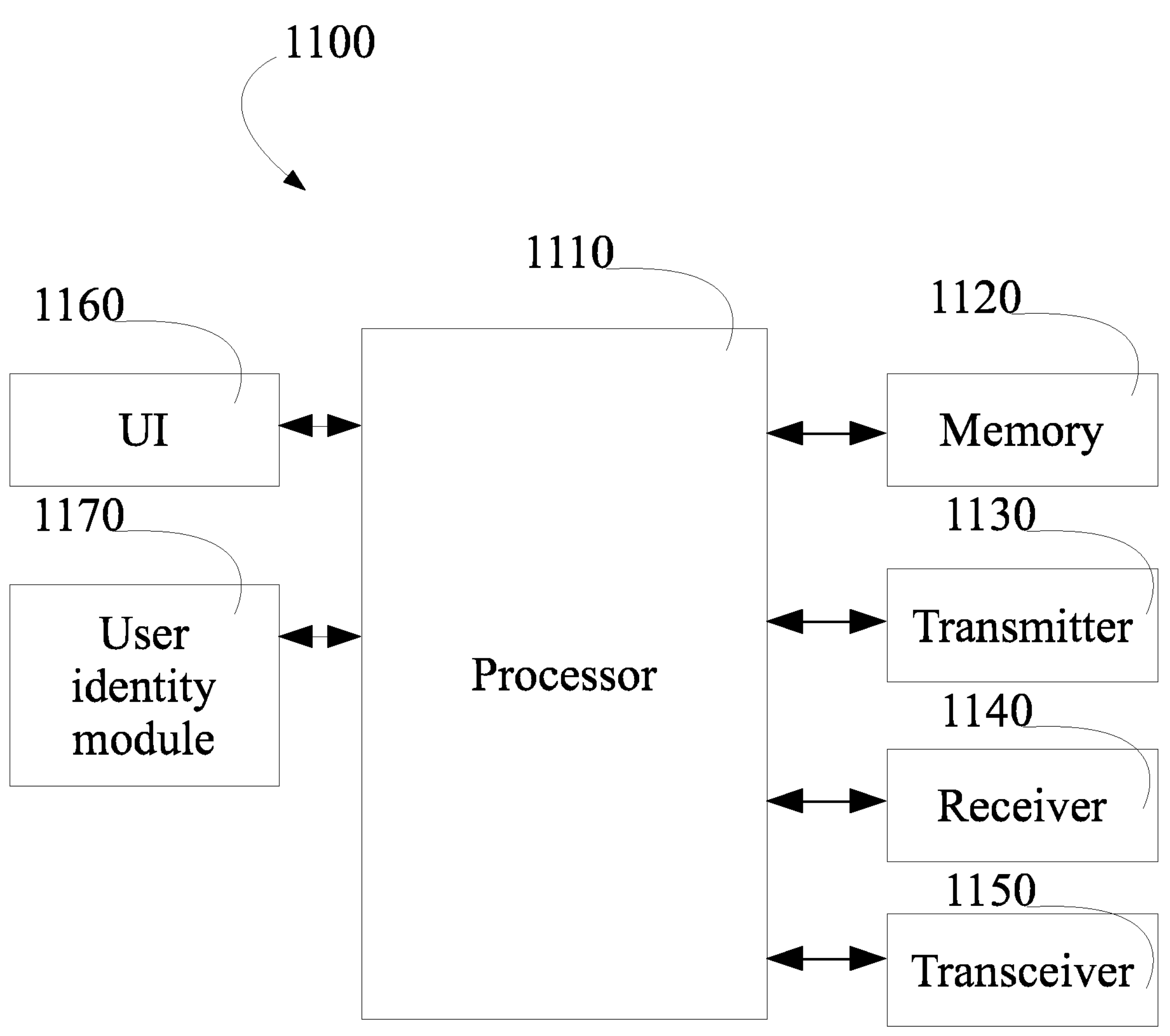
FIG. 11 shows, by way of example, a block diagram of an apparatus.

FIG. 11 shows, by way of example, a block diagram of an apparatus capable of performing methods as disclosed herein. Illustrated is device 1100, which may comprise, for example, a mobile communication device such as UE 100 of FIG. 1 or network node 104 of FIG. 1. Comprised in device 1100 is processor 1110, which may comprise, for example, a single- or multi-core processor wherein a single-core processor comprises one processing core and a multi-core processor comprises more than one processing core. Processor 1110 may comprise, in general, a control device. Processor 1110 may comprise more than one processor. Processor 1110 may be a control device. A processing core may comprise, for example, a Cortex-A8 processing core manufactured by ARM Holdings or a Steamroller processing core designed by Advanced Micro Devices Corporation.

Processor 1110 may comprise at least one Qualcomm Snapdragon and/or Intel Atom processor. Processor 1110 may comprise at least one application-specific integrated circuit, ASIC. Processor 1110 may comprise at least one field-programmable gate array, FPGA. Processor 1110 may be means for performing method steps in device 1100. Processor 1110 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone, user equipment or a network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 1100 may comprise memory 1120. Memory 1120 may comprise random-access memory and/or permanent memory. Memory 1120 may comprise at least one RAM chip. Memory 1120 may comprise solid-state, magnetic, optical and/or holographic memory, for example. Memory 1120 may be at least in part accessible to processor 1110. Memory 1120 may be at least in part comprised in processor 1110. Memory 1120 may be means for storing information. Memory 1120 may comprise computer instructions that processor 1110 is configured to execute. When computer instructions configured to cause processor 1110 to perform certain actions are stored in memory 1120, and device 1100 overall is configured to run under the direction of processor 1110 using computer instructions from memory 1120, processor 1110 and/or its at least one processing core may be considered to be configured to perform said certain actions. Memory 1120 may be at least in part external to device 1100 but accessible to device 1100.

Device 1100 may comprise a transmitter 1130. Device 1100 may comprise a receiver 1140. Transmitter 1130 and receiver 1140 may be configured to transmit and receive, respectively, information in accordance with at least one cellular or non-cellular standard. Transmitter 1130 may comprise more than one transmitter. Receiver 1140 may comprise more than one receiver. Transmitter 1130 and/or receiver 1140 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 1100 may comprise a near-field communication, NFC, transceiver 1150. NFC transceiver 1150 may support at least one NFC technology, such as NFC, Bluetooth, Wibree or similar technologies.

Device 1100 may comprise user interface, UI, 1160. UI 1160 may comprise at least one of a display, a keyboard, a touchscreen, a vibrator arranged to signal to a user by causing device 1100 to vibrate, a speaker and a microphone. A user may be able to operate device 1100 via UI 1160, for example to accept incoming telephone calls, to originate telephone calls or video calls, to browse the Internet, to manage digital files stored in memory 1120 or on a cloud accessible via transmitter 1130 and receiver 1140, or via NFC transceiver 1150, and/or to play games.

Device 1100 may comprise or be arranged to accept a user identity module 1170. User identity module 1170 may comprise, for example, a subscriber identity module, SIM, card installable in device 1100. A user identity module 1170 may comprise information identifying a subscription of a user of device 1100. A user identity module 1170 may comprise cryptographic information usable to verify the identity of a user of device 1100 and/or to facilitate encryption of communicated information and billing of the user of device 1100 for communication effected via device 1100.

Processor 1110 may be furnished with a transmitter arranged to output information from processor 1110, via electrical leads internal to device 1100, to other devices comprised in device 1100. Such a transmitter may comprise a serial bus transmitter arranged to, for example, output information via at least one electrical lead to memory 1120 for storage therein. Alternatively to a serial bus, the transmitter may comprise a parallel bus transmitter. Likewise processor 1110 may comprise a receiver arranged to receive information in processor 1110, via electrical leads internal to device 1100, from other devices comprised in device 1100. Such a receiver may comprise a serial bus receiver arranged to, for example, receive information via at least one electrical lead from receiver 1140 for processing in processor 1110. Alternatively to a serial bus, the receiver may comprise a parallel bus receiver.

Device 1100 may comprise further devices not illustrated in FIG. 11. For example, where device 1100 comprises a smartphone, it may comprise at least one digital camera. Some devices 1100 may comprise a back-facing camera and a front-facing camera, wherein the back-facing camera may be intended for digital photography and the front-facing camera for video telephony. Device 1100 may comprise a fingerprint sensor arranged to authenticate, at least in part, a user of device 1100. In some example embodiments, device 1100 lacks at least one device described above. For example, some devices 1100 may lack a NFC transceiver 1150 and/or user identity module 1170.

Processor 1110, memory 1120, transmitter 1130, receiver 1140, NFC transceiver 1150, UI 1160 and/or user identity module 1170 may be interconnected by electrical leads internal to device 1100 in a multitude of different ways. For example, each of the aforementioned devices may be separately connected to a master bus internal to device 1100, to allow for the devices to exchange information. However, as the skilled person will appreciate, this is only one example and depending on the embodiment various ways of interconnecting at least two of the aforementioned devices may be selected.

The invention claimed is:

1. An apparatus comprising at least one processor; and at least one memory including computer program code, the at least one memory and the computer program code configured to, with the at least one processor, cause the apparatus at least to perform:

receiving, from a network node, a configuration of a transmission gap in at least one downlink slot; and performing radar measurements during the transmission gap, wherein the transmission gap is configured in one orthogonal frequency division multiplexing, OFDM, symbol in the at least one downlink slot; or wherein the transmission gap is configured in a plurality of OFDM symbols, wherein the transmission gap is configured in the plurality of OFDM symbols, and the apparatus is further caused to perform:

calculating a running average of the radar measurements performed during the transmission gap configured in the plurality of OFDM symbols; and adjusting, based on the running average, transmission power of one or more uplink transmissions following the at least one downlink slot.

2. The apparatus of claim 1, further caused to perform: adjusting, based on the radar measurements, transmission power of one or more uplink transmissions following the at least one downlink slot.

3. The apparatus of claim 1, wherein the transmission gap is located in a beginning of the at least one downlink slot or in an end of the at least one downlink slot.

4. The apparatus of claim 1, wherein the configuration further comprises a configuration of a transmission gap in one or more uplink slots and/or special slots.

5. The apparatus of claim 1, wherein the configuration comprises a configuration of a plurality of transmission gaps each configured in separate downlink slots; and the apparatus is further caused to perform:

performing radar measurements during the plurality of transmission gaps;

calculating a running average over the radar measurements performed during the plurality of transmission gaps;

adjusting, based on the running average over the radar measurements, transmission power of one or more uplink transmissions following the downlink slots.

6. The apparatus of claim 1, further caused to perform:

detecting an object in proximity of the apparatus based on the radar measurements;

determining a distance between the apparatus and the object based on the radar measurements; adjusting transmission power of one or more uplink transmissions following the at least one downlink slot based on the determined distance.

7. The apparatus of claim 1, wherein the configuration is performed via downlink control information, radio resource control, and/or medium access control configuration.

8. The apparatus of claim 1, wherein the transmission gap is frequency multiplexed with transmission and/or reception.

9. A method comprising:

receiving, by a user equipment from a network node, a configuration of a transmission gap in at least one downlink slot; and performing radar measurements during the transmission gap, wherein the transmission gap is configured in one orthogonal frequency division multiplexing, OFDM, symbol in the at least one downlink slot; or wherein the transmission gap is configured in a plurality of OFDM symbols, wherein the transmission gap is configured in the plurality of OFDM symbols, and the method further comprises:

calculating a running average of the radar measurements performed during the transmission gap configured in the plurality of OFDM symbols; and adjusting, based on the running average, transmission power of one or more uplink transmissions following the at least one downlink slot.

10. An apparatus comprising at least one processor; and at least one memory including computer program code, the at least one memory and the computer program code configured to, with the at least one processor, cause the apparatus at least to perform:

receiving, from a network node, a configuration of a transmission gap in at least one downlink slot; and performing radar measurements during the transmission gap, wherein the configuration comprises a configuration of a plurality of transmission gaps each configured in separate downlink slots; and the apparatus is further caused to perform:

performing radar measurements during the plurality of transmission gaps;

calculating a running average over the radar measurements performed during the plurality of transmission gaps;

adjusting, based on the running average over the radar measurements, transmission power of one or more uplink transmissions following the downlink slots.

* * * * *